Nov. 6, 1951 — E. A. DE ZUBAY ET AL — 2,573,694
COMBUSTION CHAMBER WITH STEPPED WALL CONSTRUCTION
Filed July 30, 1946 — 2 SHEETS—SHEET 1
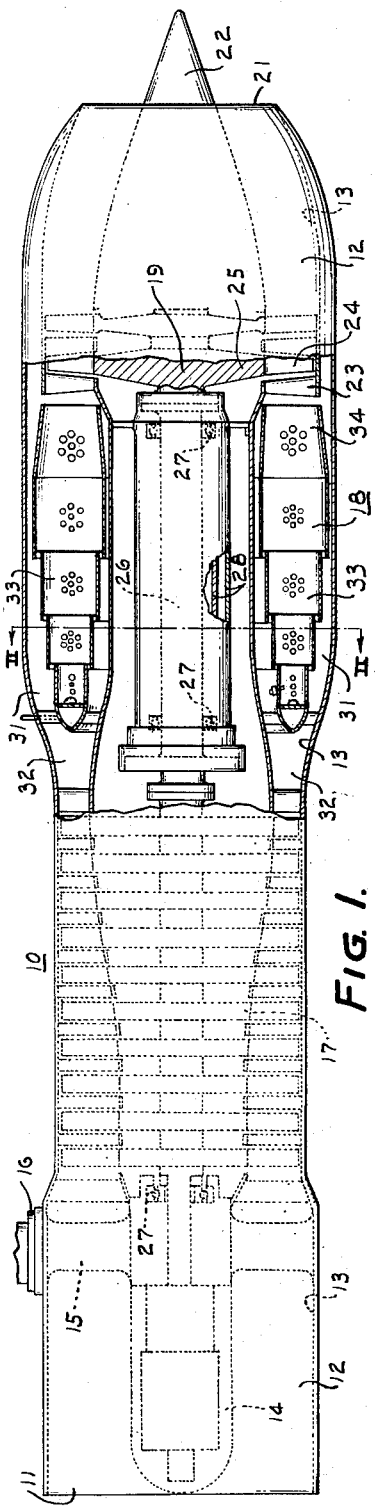
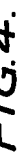
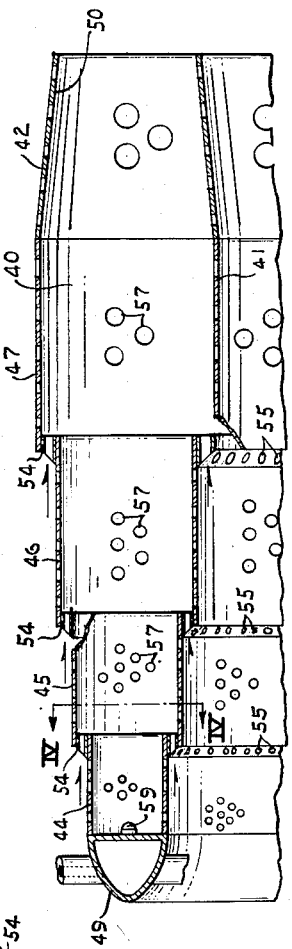
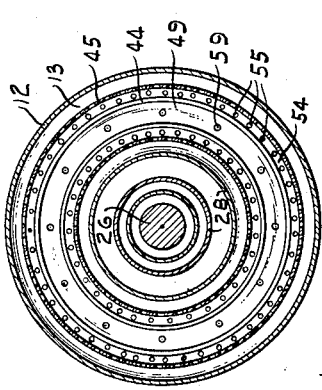
INVENTORS
EGON A. DEZUBAY &
ROBERT A. SFORZINI
BY Ralph T. French
ATTORNEY Nov. 6, 1951  E. A. DE ZUBAY ET AL  2,573,694
COMBUSTION CHAMBER WITH STEPPED WALL CONSTRUCTION
Filed July 30, 1946  2 SHEETS—SHEET 2

WITNESSES:

INVENTORS
EGON A. DEZUBAY &
ROBERT A. SFORZINI
BY
ATTORNEY

Patented Nov. 6, 1951

2,573,694

UNITED STATES PATENT OFFICE 2,573,694

COMBUSTION CHAMBER WITH STEPPED WALL CONSTRUCTION

Egon A. De Zubay and Robert A. Sforzini, Pittsburgh, Pa., assignors to Westinghouse Electric Corporation, East Pittsburgh, Pa., a corporation of Pennsylvania Application July 30, 1946, Serial No. 687,194

11 Claims.  (Cl. 60—39.65)

This invention relates to power plants and particularly to combustion apparatus for a gas turbine and it has for an object to provide an improved device of the character set forth.

The present invention, although not limited thereto, is particularly adapted for use in a gas turbine power plant of the type employed on aircraft to drive the propeller or electric generator or to supply motive fluid for jet propulsion of the aircraft. Such a plant preferably comprises a streamlined tubular casing having mounted axially therein a compressor adjacent the forward or inlet end, a turbine adjacent the rearward or discharge end, and combustion apparatus located between the compressor and turbine for heating the compressed air and which discharges the hot gases at a suitable temperature and pressure to the turbine. The spent gases on leaving the turbine are discharged through a nozzle provided at the rear of the casing and may aid in propelling the aircraft.

It is imperative that the physical dimensions and weight of a plant of this character be kept at an absolute minimum, and consequently the combustion apparatus must be small requiring it to function with high velocities of flow and to realize rates of energy release of the order of $30 \times 10^6$ B. t. u. per cubic foot per hour.

If the power plant is mounted in a nacelle or built into a wing, and even when mounted in the fuselage, the frontal area of the plant must be maintained at a minimum to reduce drag through the plant, with the result that the velocities of the hot gases leaving the combustion apparatus are high and these velocities should be about 200 to 300 feet per second.

It is accordingly a further object to provide a combustion apparatus of small size which is capable of handling a large volume of air and fuel mixture and complete combustion of the fuel in a relatively small space.

A power plant of this character operates over a wide range of fuel rates since the fuel rate for peak load, as at take-off, may be as much as ten times that for idling at high elevation. Further, the combustion apparatus must be able to burn the fuel and heat the air supplied by the compressor to a peak temperature which may be 1500° F. or even higher without danger of distorting the walls or causing excessive creep or corrosion of the apparatus.

Therefore, another object of the invention is to provide a combustion chamber having an annular wall comprised of a plurality of annular sections with their adjacent terminal portions disposed in overlapped relation and spaced radially, together with novel spacing structure for maintaining the radial spacing of the overlapped terminal portions.

Yet another object of the invention is to provide, in combustion apparatus, an annular wall comprising a plurality of annular sections having their adjacent terminal portions overlapped and radially spaced, together with novel spacing means for maintaining said radial spacing, the spacing means providing for admission of air to the space within the annular wall.

The pressure drop across the combustion chamber, comparing the state of two stations of equal velocity, should be kept at an absolute minimum since the pressure drop decreases the power which can be developed by the turbine driven by the hot gases discharging from the combustion apparatus.

The above-mentioned features, limitations, and requirements for the combustion apparatus of the gas turbine power plant for aircraft use apply also, but perhaps not as critically, to gas turbine power plants on small vessels of high power and speed, particularly naval craft or in any installation where space and weight are at a premium. It is, accordingly, a further object of the invention to provide an improved combustion apparatus capable of satisfying the above-mentioned limitations and requirements in a gas turbine power plant.

These and other objects are effected by the invention as will be apparent from the following description and claims taken in connection with the accompanying drawings, forming a part of this application, in which:

Fig. 1 is a side elevational view of a gas turbine power plant incorporating the present invention, a portion of the outer casing and of the burner tubes being removed to better illustrate the novel combustion apparatus;

Fig. 2 is a sectional view taken along the line II—II of Fig. 1, looking in the direction indicated by the arrows;

Fig. 3 is an enlarged sectional view of the combustion apparatus illustrated in Fig. 1;

Fig. 4 is a sectional view taken along the line IV—IV of Fig. 3, looking in the direction indicated by the arrows;

Figure 5:
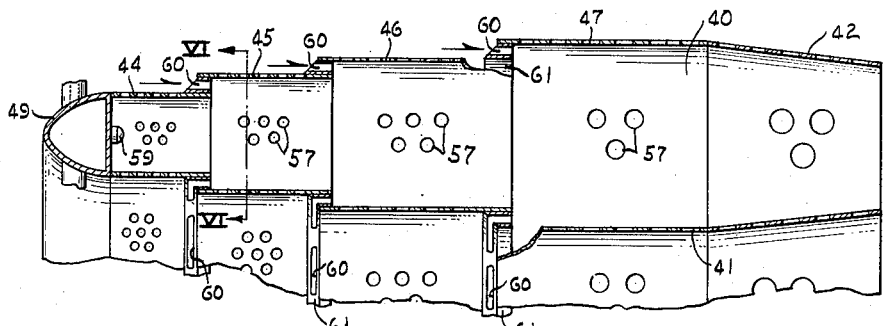
Fig. 5 is a sectional view similar to Fig. 3, but illustrating a modified construction of burner apparatus.

The power plant shown in Fig. 1 and generally indicated 10, is adapted to be mounted in or on the fuselage or wing of an airplane with the left or intake end 11, as viewed in this figure, pointed in the direction of flight.

The plant comprises an outer shell or casing structure 12 providing an annular air duct or passage 13 extending fore and aft with respect to the aircraft. This casing has mounted therein along its longitudinal axis a fairing cone 14 adapted to house gearing connected through a hollow guide vane 15 with auxiliaries 16, an axial-flow compressor 17, combustion apparatus generally indicated 18, a turbine 19 which drives the compressor, and a nozzle 21 defined by the casing 12 and by a tailpiece 22, the latter being mounted concentrically in the casing and cooperating with the latter to provide a propulsion jet.

Air enters at the intake end 11 and flows substantially straight through the plant, passing through the compressor 17, where it is compressed, and into the combustion apparatus 18, where it is heated. The hot gases, comprising the products of combustion and excess air heated by the combustion, on leaving the combustion apparatus, are directed by suitable guide vanes or nozzles 23 against the blades 24 of the turbine disc 25 and then are discharged through the propulsion nozzle 21 to propel the aircraft.

The present invention is not limited to the specific details or arrangement of the structure thus far described, but it is primarily concerned with the combustion apparatus which heats the compressed air supplied by the compressor without disturbing the straight-through flow of the plant, thereby permitting a design of small maximum diameter.

By reference to Fig. 1, it will be noted that the compressor and turbine rotors are interconnected by means of a shaft 26 supported in suitable bearings, indicated at 27, and enclosed by an inner casing structure, generally indicated 28, which protects the shaft and bearings from high temperatures and also defines the portion of the annular air flow passage 13 in which the combustion apparatus 18 is mounted.

In order to maintain the combustion apparatus and the outer casing structure of small maximum diameter, the combustion apparatus is divided by wall structure into an air space or spaces 31 open to the discharge end of a diffuser passage 32 leading from the compressor, and which overlap a burner space or spaces 33 open to a passage 34 leading to the turbine guide vanes 23. Atomized fuel is supplied to the forward end of the burner space or spaces which are also provided with ignition means. The dividing wall structure has openings therein to provide for entry into the burner space of compressed air from the overlapping air spaces, the entering air supporting combustion of fuel and mixing with the hot products of combustion to provide a motive fluid comprising a mixture of air and products of combustion of suitable temperature for driving the turbine.

The dividing wall structure separating the air and burner spaces may be constituted in any suitable manner, provided that it is disposed so that the air space overlaps axially the burner space or spaces and so that air may flow into the latter along the structure to enable combustion to be completed or substantially completed within the axial length of the burner spaces. In this way, the axial length of the apparatus is kept at a minimum because it does not require the division of the air stream into two distinct streams of primary and secondary air, the primary air being used to complete the combustion, with the remaining secondary air stream being mixed with the combusted gases to lower the final temperature.

Referring now to the construction illustrated in Figs. 3 and 4, there is shown an annular combustion chamber 40, defined by an inner wall 41 and an outer wall 42, both of stepped construction, the inner wall being comprised by annular sections of progressively decreasing diameter from the upstream end to the downstream end thereof and the outer wall comprising a similar series of annular sections but of progressively increasing diameter from the upstream to the downstream end thereof, this construction providing that the combustion chamber 40 is of progressively increasing cross-sectional area in the direction of flow of gases therethrough.

The outer annular wall 42 is comprised by a series of annular sections 44, 45, 46 and 47 extending from the nozzle manifold 49 to the converging guide structure 50 which serves to direct the hot products of combustion from the combustion chamber 40 to the stationary turbine blading 23. The nozzle manifold 49 has mounted thereon a plurality of nozzles 59 serving to inject fuel into the upstream end of the combustion chamber 40.

The inner and outer walls 41 and 42 are of similar construction except that one diverges and the other converges in the direction of flow of air formed thereby and hence, only the outer wall structure will be described in detail. As previously indicated, this wall comprises a series of annular sections 44, 45, 46 and 47, the sections all being smooth-walled and the overlapping terminal portions of adjacent sections being spaced radially a distance sufficient to closely receive annular spacer members 54, preferably secured to both the overlapped and overlapping terminal portions by suitable means, such as spot-welding.

These spacer members 54 are in the form of endless annular rings and are preferably provided with a circumferential series of openings 55 therein, extending parallel to the axis of the combustion chamber and providing for admission of air to the chamber from the overlapping air space 31 enveloping the same.

In addition to these annular series of air admission openings 55, the annular sections 44, 45, 46 and 47 may be provided with additional openings 57 for admission of more air to the combustion chamber, these openings being located wherever additional air is desired.

Figure 6:
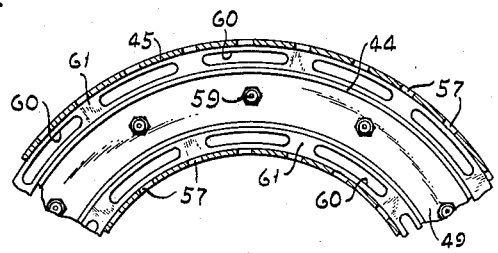
Fig. 6 is a sectional view taken along the line VI—VI of Fig. 5, looking in the direction indicated by the arrows.

The construction illustrated in Figs. 5 and 6 differs from that just described only in that the air admission openings 60 in the spacer members 61 are elongated circumferentially to provide for greater air passage cross-sectional area for applications where admission of larger quantities of air at the overlapping joints is desired.

Figure 7:
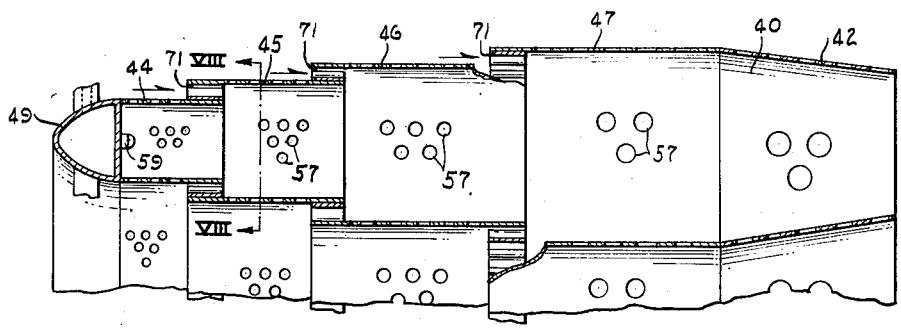
Fig. 7 is a sectional view similar to Figs. 3 and 5, but showing yet another modification.
Figure 8:
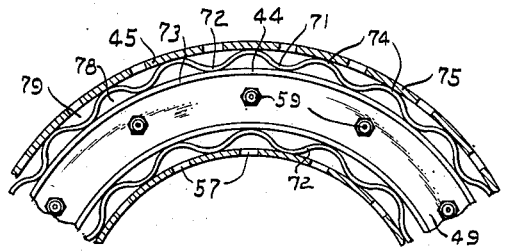
Fig. 8 is a sectional view taken along the line VIII—VIII of Fig 7, looking in the direction indicated by the arrows.

In the modification of Figs. 7 and 8, the spacer members 71 are preferably in the form of circumferentially corrugated rings, whose inwardly-depressed portions 72 engage the terminal portions 73 of the smaller adjacent sections and whose outwardly-raised portions 74 engage the terminal portions 75 of the larger adjacent annular sections, this convoluted or corrugated spacer not only providing a flexible connection over the overlapped terminal portions, but also providing air admission openings 78 and 79 for flow of air to the interior of the combustion chamber.

While the invention has been shown in several forms, it will be obvious to those skilled in the art that it is not so limited, but is susceptible of various other changes and modifications without departing from the spirit thereof.

What is claimed is:

1. In a combustion chamber adapted for admission of fuel to the upstream end thereof and discharge of hot gases from the downstream end thereof, an annular wall comprising a plurality of annular sections of different sizes arranged concentrically and in order of increasing size from the upstream end toward the downstream end of said chamber with adjacent terminal portions of the sections overlapping and spaced radially, and spacer members disposed in said radial spaces between said overlapping terminal portions and to which the latter are secured.

2. Structure as specified in claim 1, wherein said spacer members are provided with passages providing for flow of air from exteriorly of said annular wall to interiorly thereof.

3. Structure as specified in claim 1, wherein said spacer members are in the form of annular members.

4. Structure as specified in claim 1, wherein said spacer members comprise rings having passages therethrough for entry of air to the space within said annular wall.

5. Structure as specified in claim 1, wherein said spacer members comprise corrugated strips whose corrugations provide passages for entry of air to the space within said annular wall.

6. Structure as specified in claim 1, wherein said spacer members comprise rings having openings extending axially therethrough, said openings being elongated circumferentially in cross section.

7. In a combustion chamber, an annular outer wall of stepped construction, each of said steps comprising an annular section of materially greater diameter than the preceding section and overlapping the latter, and each riser of said stepped construction comprising an annular member overlapping the adjacent terminal portion of the section of smaller diameter and being overlapped by the adjacent terminal portion of the section of larger diameter.

8. Structure as specified in claim 7, wherein said risers are secured to said overlapped and overlapping terminal portions of the adjacent sections and serve as connecting means therebetween.

9. Structure as specified in claim 7, wherein said risers comprise rings having openings therethrough axially, whereby air may enter combustion chamber at said risers.

10. Structure as specified in claim 7, wherein said risers comprise corrugated annular strips, said corrugations extending generally axially and providing passages for entry of air to the interior of said combustion chamber.

11. In an annular combustion chamber, concentric and coaxial inner and outer annular walls of stepped construction, the steps of the outer wall comprising a plurality of annular sections increasing progressively in diameter from one end of the chamber to the other end and the steps of the inner wall comprising a plurality of annular sections decreasing progressively in diameter from said one end to said other end of the chamber, whereby said chamber increases progressively in cross-sectional area from said one end to said other end, the terminal portion of adjacent annular sections overlapping, and each riser of the stepped construction comprising an annular member overlapping the adjacent terminal portion of the section of lesser diameter and being overlapped by the adjacent terminal portion of the section of greater diameter.

EGON A. DE ZUBAY.
ROBERT A. SFORZINI.

REFERENCES CITED

The following references are of record in the file of this patent:

UNITED STATES PATENTS

| Number | Name | Date |
|---|---|---|
| 1,311,235 | Kemp | July 29, 1919 |
| 2,181,138 | Landis | Nov. 28, 1939 |
| 2,256,198 | Hahn | Sept. 16, 1941 |
| 2,268,464 | Seippel | Dec. 30, 1941 |
| 2,409,177 | Allen | Oct. 15, 1946 |
| 2,446,059 | Peterson | July 27, 1948 |
| 2,448,561 | Way | Sept. 7, 1948 |

FOREIGN PATENTS

| Number | Country | Date |
|---|---|---|
| 539,069 | Great Britain | Aug. 27, 1941 |